(12) United States Patent
Hume

(10) Patent No.: US 8,308,483 B2
(45) Date of Patent: Nov. 13, 2012

(54) ROTATABLE DRAWING DEVICE

(76) Inventor: Christopher A. Hume, Lafayette, CO (US)

( * ) Notice: Subject to any disclaimer, the term of this patent is extended or adjusted under 35 U.S.C. 154(b) by 588 days.

(21) Appl. No.: 12/510,826

(22) Filed: Jul. 28, 2009

(65) Prior Publication Data

US 2010/0028838 A1 Feb. 4, 2010

Related U.S. Application Data

(60) Provisional application No. 61/137,298, filed on Jul. 29, 2008.

(51) Int. Cl.
*G09B 11/00* (2006.01)
(52) U.S. Cl. ......................................................... 434/81
(58) Field of Classification Search .................... 434/81, 434/82, 84, 85, 89, 95, 101, 408; 118/506
See application file for complete search history.

(56) References Cited

U.S. PATENT DOCUMENTS

| | | | |
|---|---|---|---|
| 1,207,868 A | 12/1916 | Craighead | |
| 1,678,088 A | 7/1928 | Sideman | |
| 2,557,348 A * | 6/1951 | Hornbostel | 118/506 |
| 3,323,491 A * | 6/1967 | Granick | 118/506 |
| D219,108 S | 11/1970 | Lange | |
| 3,599,925 A | 8/1971 | Dubler | |
| 3,756,169 A | 9/1973 | Dybvig | |
| 3,834,070 A * | 9/1974 | Breslow et al. | 446/146 |
| D234,477 S | 3/1975 | Lockhardt et al. | |
| 4,127,963 A * | 12/1978 | Shiraishi | 446/146 |
| 4,144,662 A | 3/1979 | Drexler | |
| 4,760,802 A | 8/1988 | Leong | |
| 4,822,639 A * | 4/1989 | Fujii et al. | 427/240 |
| D316,639 S | 5/1991 | Adler | |
| 5,088,678 A | 2/1992 | Bitan | |
| 5,134,778 A * | 8/1992 | MacCarthy | 33/27.11 |
| 5,176,263 A | 1/1993 | Caruso | |
| 5,242,496 A * | 9/1993 | Handy | 118/52 |
| 5,289,783 A | 3/1994 | Karl | |
| D350,626 S | 9/1994 | Ross | |
| 5,794,540 A | 8/1998 | Dombrowski et al. | |
| 5,855,351 A | 1/1999 | Cziraky | |
| 5,941,713 A | 8/1999 | Wayner et al. | |
| 6,492,112 B1 | 12/2002 | Reinhard | |
| 6,843,701 B1 * | 1/2005 | Arnone | 446/146 |
| 6,942,109 B2 | 9/2005 | Aros et al. | |
| D530,109 S | 10/2006 | Barrett | |
| 7,234,602 B2 * | 6/2007 | Roberti | 211/65 |
| 7,641,464 B2 * | 1/2010 | Griffin et al. | 425/267 |

(Continued)

OTHER PUBLICATIONS

Andrew Dahley, "Cooperative Learning Class", May 9, 2005 [retrieved online Feb. 13, 2012].*

*Primary Examiner* — Kurt Fernstrom
(74) *Attorney, Agent, or Firm* — Jennifer L. Bales; Macheledt Bales LLP

(57) ABSTRACT

A rotatable drawing device intended for children. The top and sides of said device are attached and are formed to accept drawing mediums such as chalk, water or dry erase marker used to color, write and draw upon this device. The top of the drawing device has a recessed portion to hold the drawing medium when not in use. The drawing device rests upon and is attached to a base platform on which it rotates. The drawing unit is spaced above the base platform so that the drawing cylinder may rotate about its center axis. Feet adhered to the bottom of the base hold the invention off the floor.

12 Claims, 8 Drawing Sheets

U.S. PATENT DOCUMENTS

| | | | |
|---|---|---|---|
| 7,851,957 B2 * | 12/2010 | Krapf et al. | 310/90.5 |
| 7,972,138 B2 * | 7/2011 | Hachey et al. | 434/85 |
| 2005/0184479 A1 | 8/2005 | Moore | |
| 2007/0034122 A1 | 2/2007 | Shenker et al. | |
| 2010/0285430 A1 * | 11/2010 | MacFadyen et al. | 434/84 |

* cited by examiner

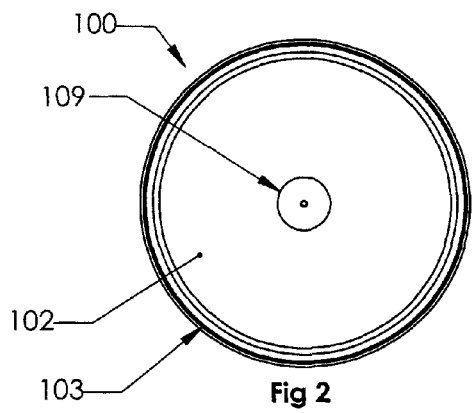
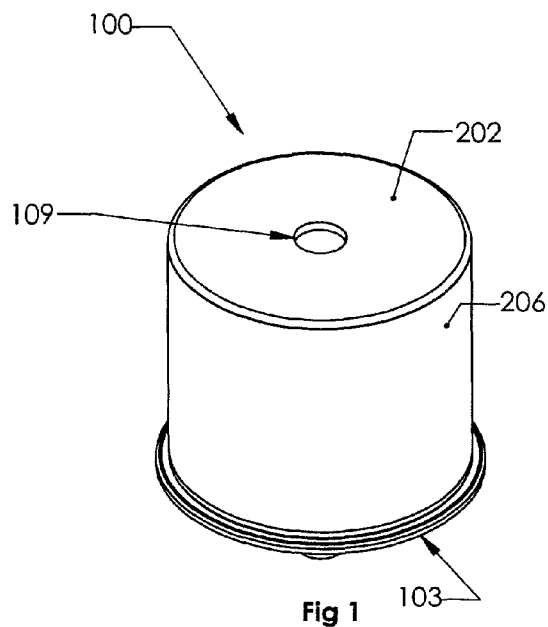
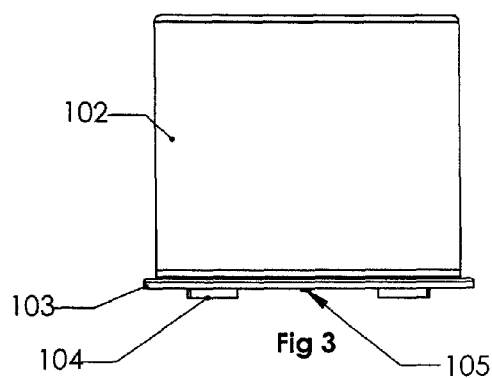
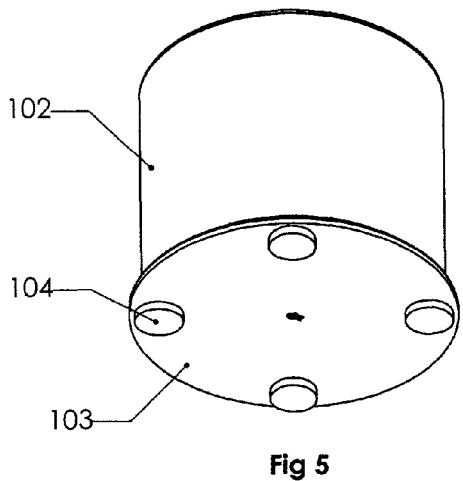
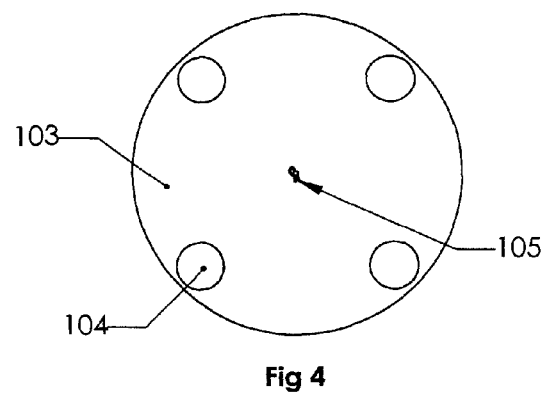

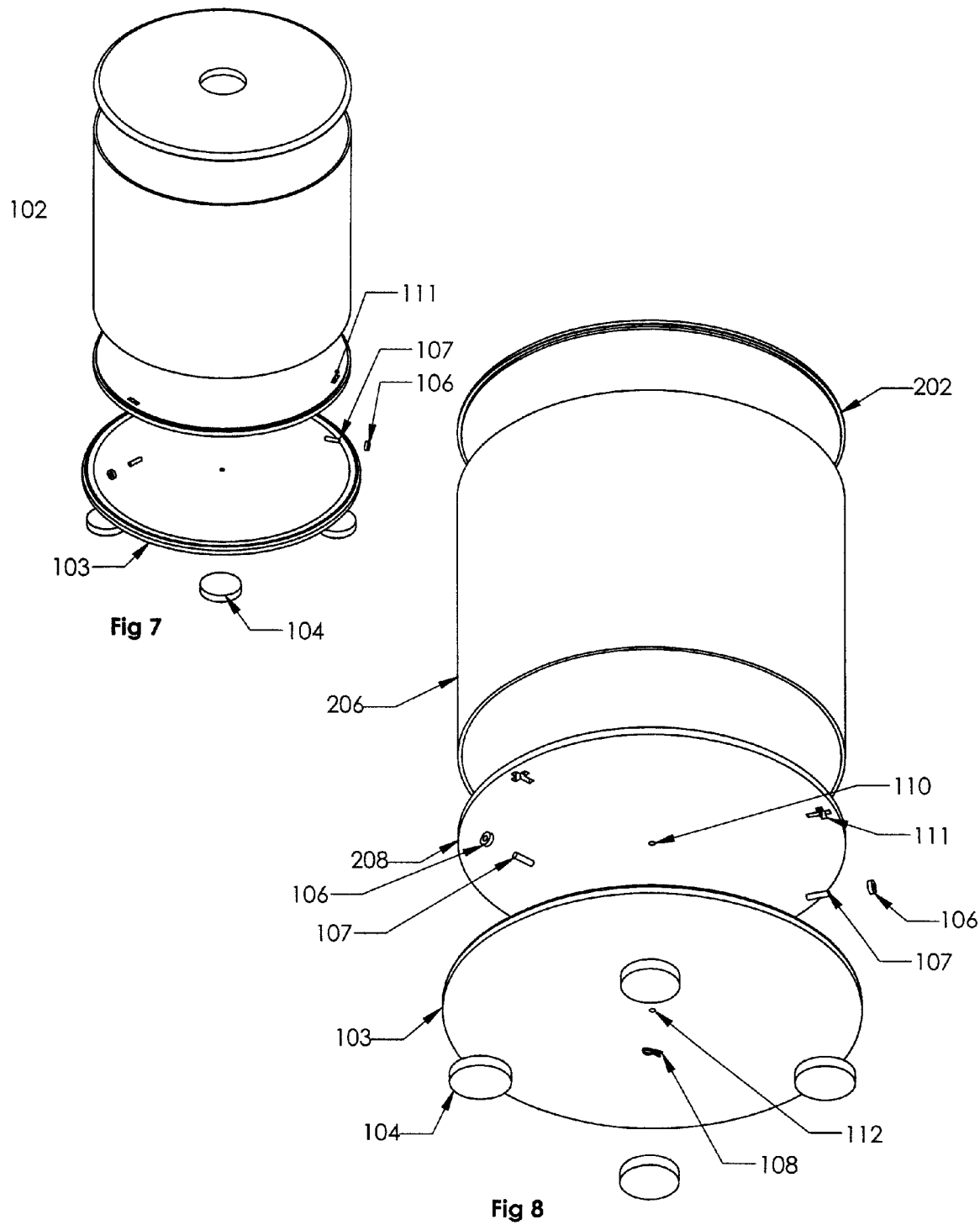

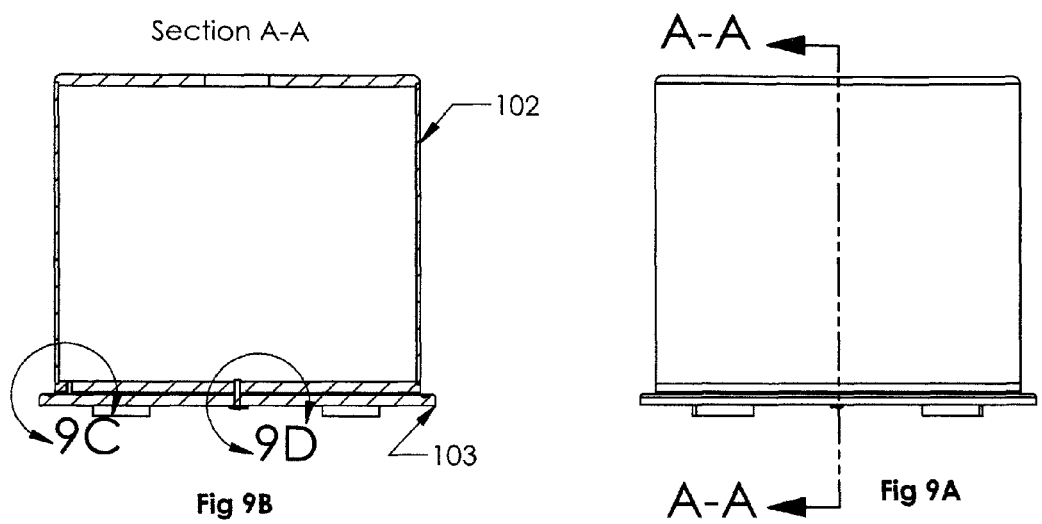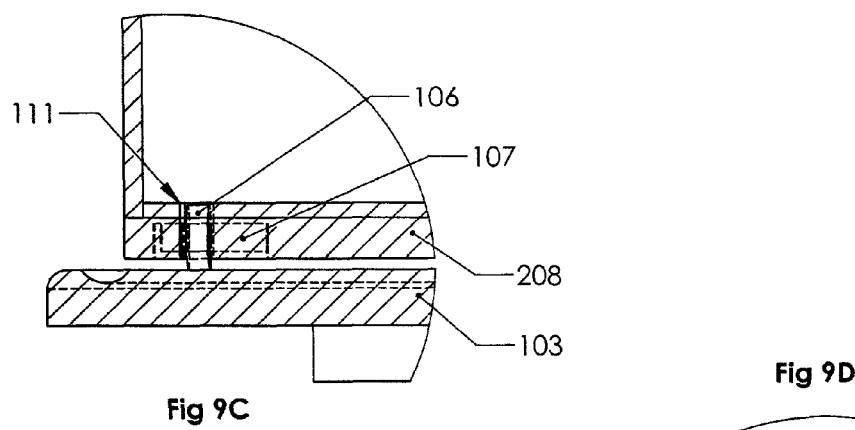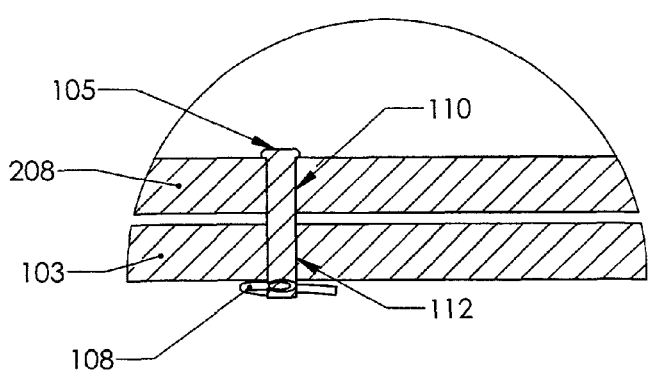

ROTATABLE DRAWING DEVICE

BACKGROUND OF THE INVENTION

1. Field of the Invention

The present invention relates to a rotatable drawing device intended for children.

2. Discussion of the Background Art

Children of all ages love to draw. Art, more specifically drawing, is crucial for the development of certain skill-sets in children such as fine motor skills and eye-hand coordination. The importance of art and drawing is recognized and thus is a major part of most curriculums. To date, canvases have generally been limited to stationary, two-dimensional shapes. The stagnant nature of these fixed drawing canvases limits the exploration and creativity process. The Chalk Spinner—a cylindrical, rotating chalkboard, provides a more engaging drawing medium which expands exploration and development. This three-dimensional moving canvas teaches additional development skills, such as gross motor skills, spatial awareness, social interaction and academic skills. As the Chalk Spinner body rotates, designs such as spirals and long straight lines, which would otherwise be difficult for inexperienced hands, become more manageable encouraging creativity, reinforcing self-esteem and persuading users to broaden their drawing repertoire.

A need remains in the art for a rotatable drawing device to allow drawing on its sides and top as it rotates.

SUMMARY OF THE INVENTION

It is an object of the present invention to provide a rotatable drawing device that allows drawing on its sides and top as it rotates. The device includes a top with a generally horizontal drawing surface connected to a body having a generally vertical surface. A rotation unit allows the body (and the top) to rotate with respect to a base. The top and the body are configured to accept a drawing medium. For example, they may be coated with a whiteboard surface, or a chalkboard surface. One embodiment comprises a cylinder body capped by a disk top. The top may include a recess formed about its periphery to allow the drawing medium (chalk or the like) to be stored there. The rotation unit might comprise a clevis pin and a cotter pin, or it might comprise a lazy susan bearing.

BRIEF DESCRIPTION OF THE DRAWINGS

FIG. 1 is an isometric view from the top of one embodiment of a rotatable drawing device according to the present invention.

FIG. 2 is a top plan view of the rotatable drawing device of FIG. 1.

FIG. 3 is a side view of the rotatable drawing device of FIG. 1, showing the base and feet of the device.

FIG. 4 is a bottom view of the rotatable drawing device of FIG. 1.

FIG. 5 is a bottom isometric view of the rotatable drawing device of FIG. 1.

FIG. 7 is a top exploded isometric view of the rotatable drawing device of FIG. 1.

FIG. 8 is a bottom exploded isometric view of the rotatable drawing device of FIG. 1

FIG. 9A-D illustrate details of the rotatable drawing device of FIG. 1. FIG. 9A is a front view of the rotatable drawing device of FIG. 1 showing a cutaway line A-A. FIG. 9B is a front view designating detail areas 9C and 9D. From this section A-A, Detail 9C is shown in FIG. 9C and Detail 9D is shown in FIG. 9D.

DETAILED DESCRIPTION OF THE PREFERRED EMBODIMENTS

Figure 6:
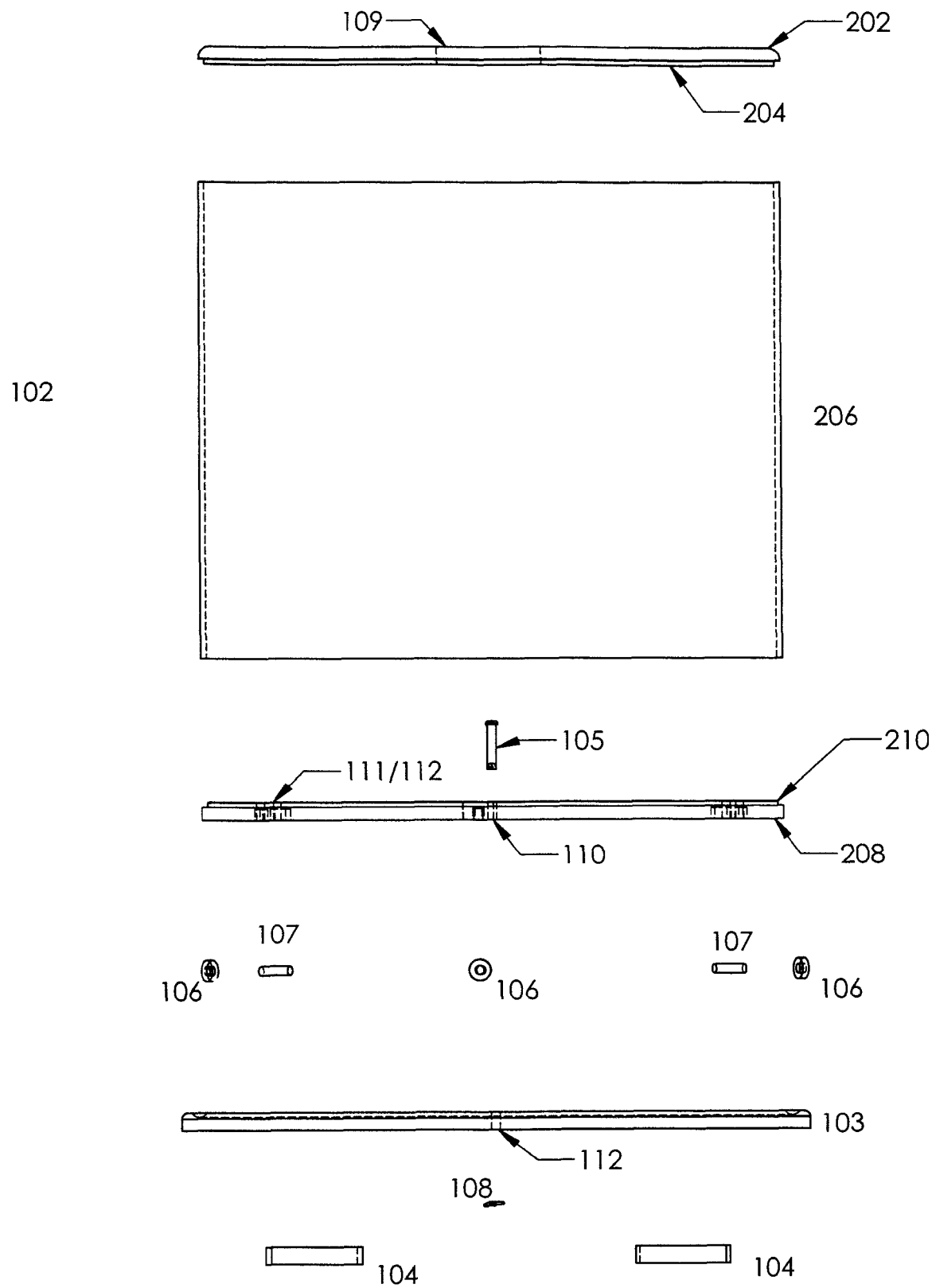
FIG. 6 is an exploded view of the rotatable drawing device of FIG. 1, with every part visible.

The following reference numbers are used in the drawings described below.

| Ref. No. | Part |
| --- | --- |
| 100 | Rotatable drawing device |
| 102 | Main body assembly |
| 103 | Base |
| 104 | Feet |
| 105 | Clevis pin |
| 106 | Bearings |
| 107 | Bearing shafts |
| 108 | Cotter pin |
| 109 | Medium holder recess |
| 110 | Cylinder axis hole |
| 111 | Bearing recess |
| 112 | Base axis hole |
| 202 | Cylinder top |
| 204 | Top neck |
| 206 | Cylinder body |
| 208 | Cylinder bottom |
| 210 | Bottom neck |
| 211 | Circular lazy susan bearing |

The rotatable drawing device entertains children and adults alike by providing a rotating three-dimensional canvas on which many drawing mediums may be used. The rotating body encourages creativity by appearing as an endless drawing surface. In addition the moving surface allows for a different drawing technique. Unlike conventional paper and pen, users may create designs by moving the drawing device in addition to the drawing medium. As the body rotates, designs such as spirals and long straight lines, which would otherwise be difficult for inexperienced hands, become more manageable encouraging creativity, reinforcing self-esteem and persuading users to broaden their drawing repertoire.

Both the Cylinder Top 202 and the sides of Cylinder body 206 of the drawing device are intended to accept the drawing medium. Three-dimensional thought is provoked in this arrangement by encouraging the user to imagine the images on top connecting to the images on the sides. While this process is not obvious, once noticed it provides a complexity in thought that is beneficial in broadening maturing minds.

FIG. 1 is an isometric view of a preferred embodiment of rotatable drawing device 100. FIG. 2 is a top plan view of rotatable drawing device 100. Drawing device 100 comprises a Main body assembly 102 and a base 103. Main body assembly 102 rotates about its axis with respect to base 103. Main body assembly 102 includes top 202, body 206 and bottom 208, designed to accept the intended drawing medium (for example, chalk, water, or dry erase marker). Top 202 and body 206 form continuous vertical and horizontal drawing surfaces. Body 206 and bottom 208 form a continuous vertical surface. Cylinder top 202 includes a recessed medium holder 109, in which chalk or the like (not shown) may be kept.

Main body assembly 102 may be fabricated with a variety of materials, including but not limited to: wood, MDF, plastic, concrete, stainless steel or aluminum. Main body assembly 102 may be coated with a variety of materials to allow for different drawing mediums. For example, chalkboard paint is applied when the intended medium is chalk. Metallic primer may be applied so that magnets may be applied to the surface. Water as a medium utilizes a waterproof layer under a slate paint mixture. Dry erase in addition to other mediums may use a variety of different coatings. Additionally the unit may be used indoors or outdoors, for example in a classroom or outdoors as part of playground equipment.

FIG. 3 is a side view of rotatable drawing device 100. Feet 104 attached to base 103 lift rotatable drawing device 100 off of the floor. Feet 104 may comprise a resilient, nonskid material such as rubber to prevent the device 100 from moving or scratching the floor. Feet 104 are attached with rivets.

FIG. 6 is an exploded view of rotatable drawing device 100. Cylinder top 202, cylinder body 206, and cylinder bottom 208 connect together by inserting the top neck 204 and the bottom neck 210 into top and bottom collars formed by body 206. Top neck 204 fits inside the top opening of cylinder body 206. Similarly bottom neck 210 fits inside the bottom opening of cylinder body 206. These three parts are preferably adhered together using epoxy, wood glue or other method approved for bonding together materials. The combination of cylinder top 202, cylinder body 206, and cylinder bottom 210 are preferably adhered together to comprise Main body assembly 102.

Figure 10:
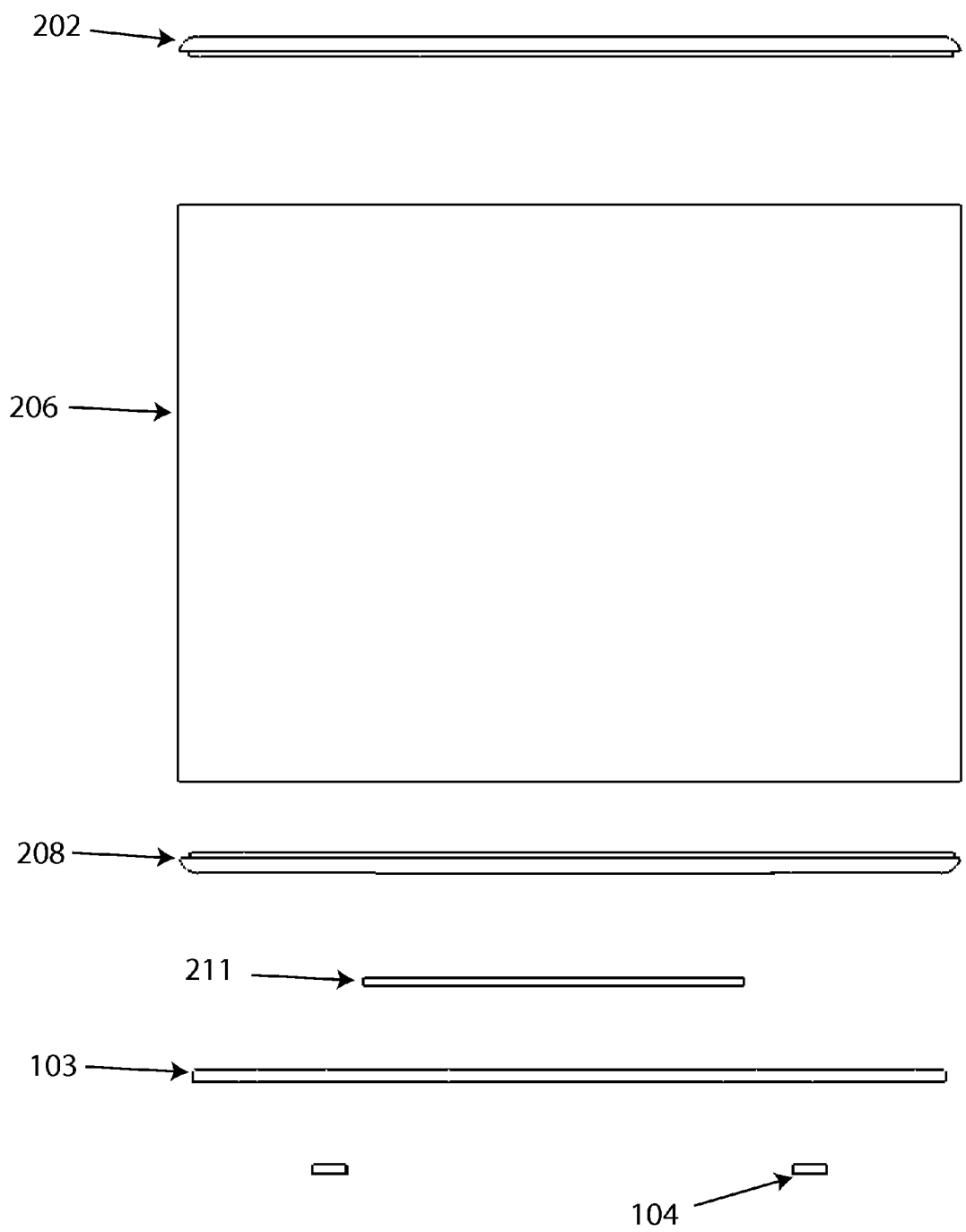
FIG. 10 is an exploded view of a second embodiment of the rotatable drawing device of FIG. 1, with every part visible.
Figure 11:
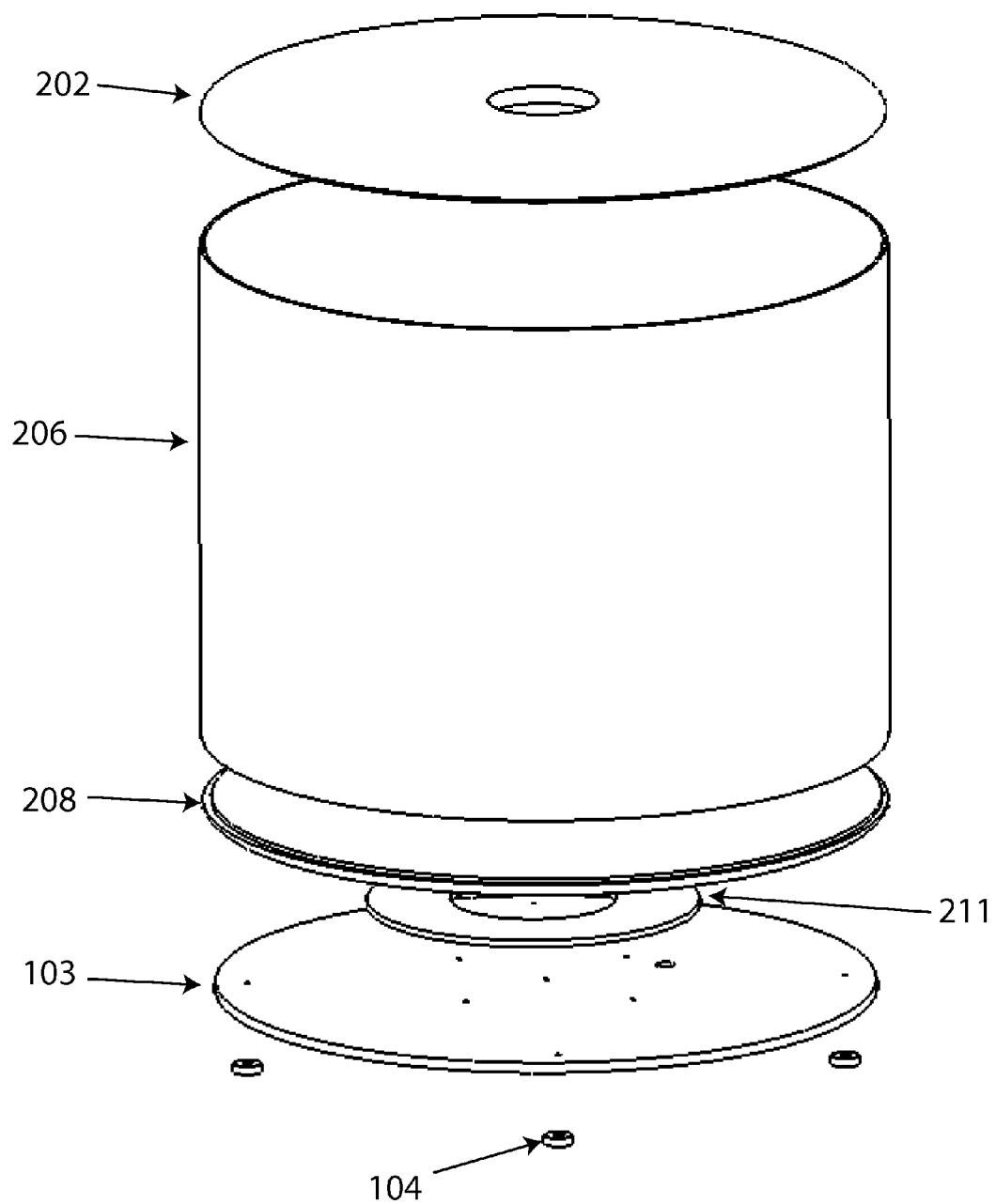
FIG. 11 is a top exploded isometric view of the second embodiment.
Figure 12:
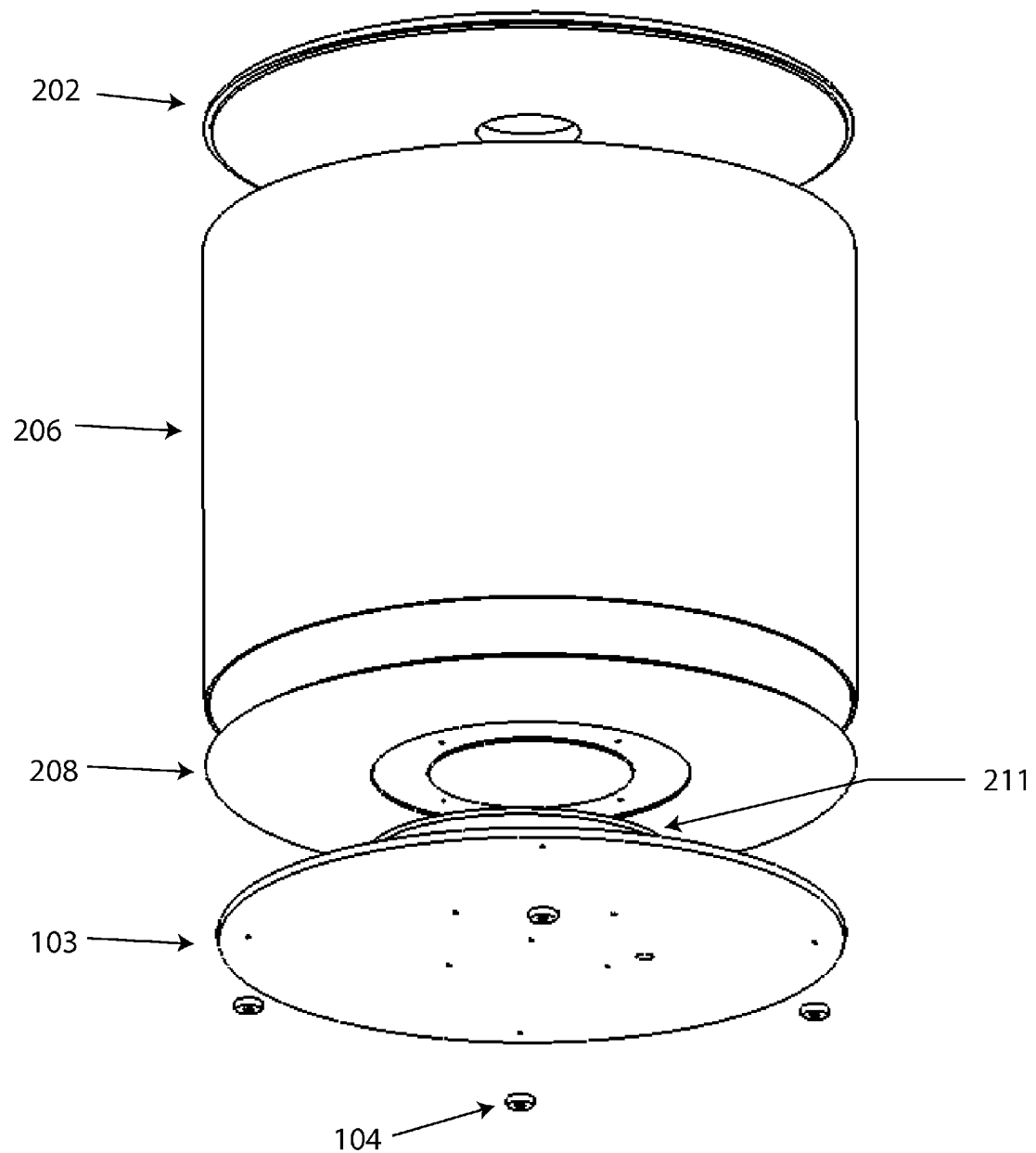
FIG. 12 is a bottom exploded isometric view of the second embodiment.

Two embodiments of the rotatable drawing device are shown in FIGS. 1-12. The first embodiment is specifically shown in FIGS. 3-9d, and the second embodiment is illustrated in FIGS. 10-12. FIGS. 1 and 2 apply to both embodiments.

Main Body Assembly—Embodiment 1 (FIGS. 3-9d):

Clevis pin 105, which attaches Main body assembly 102 to base 103, is visible in FIG. 3, but is better shown in FIGS. 4 and 5.

FIG. 4 is a bottom view of rotatable drawing device 100, and FIG. 5 is a bottom isometric view of rotatable drawing device 100. Main body assembly 102 is attached to unit base 103 via a clevis pin 105 and cotter pin 108 (see FIG. 6). This combination restrains Main body assembly 102 to rotation about its axis.

FIG. 6 is an exploded view of rotatable drawing device 100, assembly method 1, with every part visible. Main body assembly 102 is attached to base 103 via a clevis pin 105 and cotter pin 108 (See FIG. 9D). Bearings 106 rotate upon bearing shafts 107 and space Main body assembly 102 off base 103 with sufficient spacing to allow Main body assembly 102 to rotate about its center axis. Feet 104 adhered to the unit base 103 hold the invention off the floor.

FIG. 7 is a top exploded isometric drawing of rotatable drawing device 100, and FIG. 8 is a bottom isometric drawing of rotatable drawing device 100. Main body assembly 102 rests upon base 103, which acts as a platform upon which Main body assembly 102 rotates. Base 103 sits flush with Main body assembly 102. Bearings 106, bearing shafts 107 and bearing recesses 111 are visible in FIG. 8, but are better shown in FIG. 9C.

Main body assembly 102 rotates about clevis pin 105 relative to base 103. Base 103 sits stationary to the floor upon four feet 104. Feet 104 are adhered to base 103 using rivets.

FIGS. 9A-D illustrate details of the rotatable drawing device of FIG. 1. FIG. 9A is a front view of the rotatable drawing device 100 showing cutaway line A-A. FIG. 9B is a side view (rotated 90° from the view of FIG. 9A) of drawing device 100 designating detail areas 9C and 9D. Along this section A-A, Detail 9C is shown in FIG. 9C and Detail 9D is shown in FIG. 9D.

FIG. 9C shows Detail 9C from FIG. 9B, along section lines A-A of FIG. 9A. Bearing 106 and bearing shaft 107 fit within bearing recess 111. FIG. 9D shows Detail 9D from FIG. 9B, along section lines A-A of FIG. 9A. Clevis pin 105 extends downward through cylinder axis hole 110 and base axis hole 112. It is held in place by cotter pin 108.

Main Body Assembly—Embodiment 2 (FIGS. 10-12):

FIG. 10 is an exploded side view of rotatable drawing device 100 using a slightly different assembly method. FIG. 11 is a top isometric view and FIG. 12 is a bottom isometric view of rotatable drawing device 100. Main body assembly 102 is attached to base 103 via circular lazy susan bearing 211 (FIG. 10). Bearing 211 glides on internal ball bearings, allowing for a smooth, stable revolving motion of Main body assembly 102 against base 103.

Main body assembly 102 rotates upon bearing 211 relative to base 103. Base 103 sits stationary to the floor upon four feet 104. Feet 104 are adhered to base 103 using rivets.

The following paragraph describes a specific example of a rotatable drawing device Dimensions and materials are as follows: Overall height 22". Diameter of drawing cylinder 102 is 25". Diameter of the base 103 is 25". The Top 202 and bottom 208 are ⅝" MDF and base 103 is ⅜" MDF. The Top 202, bottom 208 and base 103 are all glued together to create the Main body assembly 102. All pieces are painted with chalk board paint and attached together with Cotter pin 108 and Clevis pin 105 (embodiment 1) or circular lazy susan bearing 211 (embodiment 2).

Sufficient space is provided between the Main body assembly 102 and base 103 by bearings 106 or 211 so that unobstructed rotation is obtained, but the space is also small enough to eliminate pinching hazards associated with gaps between rotating objects.

Figure 13:
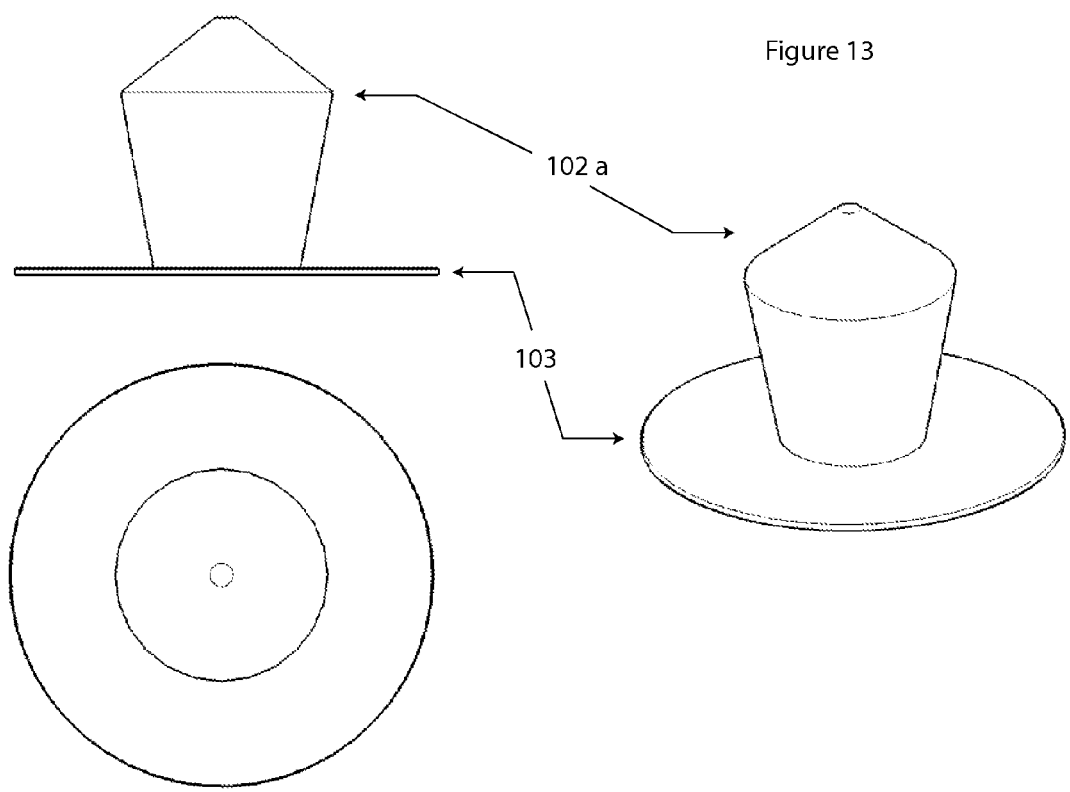
FIG. 13 is an isometric view of a third embodiment of the present invention.

FIG. 13 is an isometric view of a third embodiment of the present invention. In the embodiment of FIG. 13, body 102A includes walls and a top like the previous two embodiments, but the walls and the top are both slightly slanted. The top is generally horizontal, but not exactly, and the walls are generally vertical, but not exactly. In other respects, the rotatable drawing device of FIG. 13 is very much like those of FIGS. 1-12, and the discussion associated with those figures applies to this embodiment.

Figure 14:
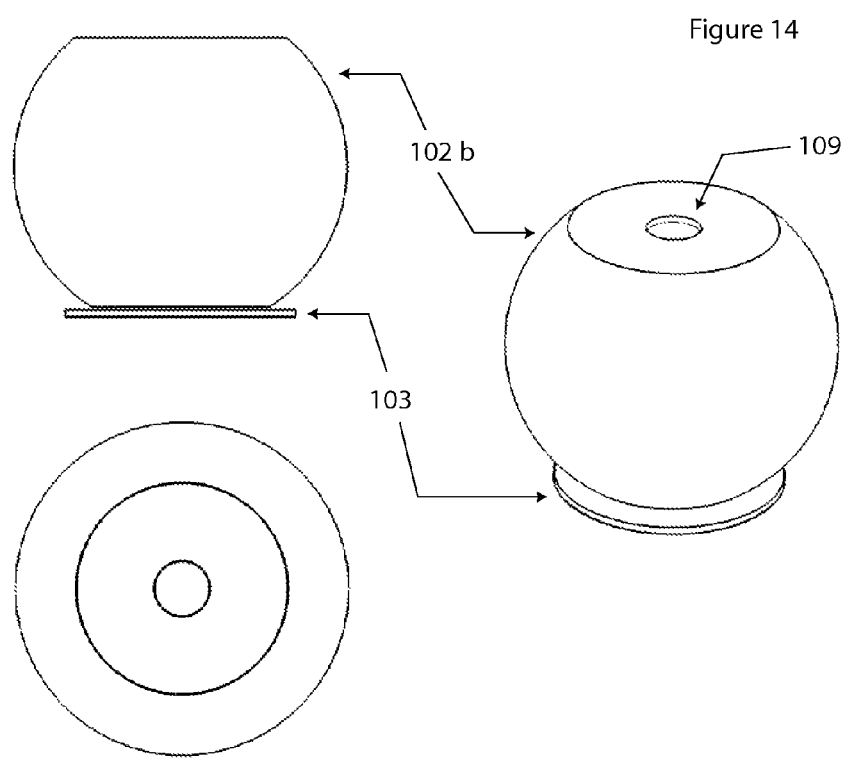
FIG. 14 is an isometric view of a fourth embodiment of the present invention.

FIG. 14 is an isometric view of a fourth embodiment of the present invention. In the embodiment of FIG. 14, body 102A includes walls and a top like the previous two embodiments, but the walls are curved, forming a section of a sphere. The top is horizontal in this embodiment. The walls are generally vertical, but not exactly, because they are curved. In other respects, the rotatable drawing device of FIG. 14 is very much like those of FIGS. 1-13, and the discussion associated with those figures applies to this embodiment.

Those skilled in the arts will appreciate that many variations fall within the scope of the present invention. For example, Rotation of the Main body assembly 102 may be provided by other methods such as wheels embedded in base 103, or mounting body 102 on a post.

A variety of shapes such as but not limited to square, rectilinear, oval, or spherical are possible depending on the intended audience and use. In the case of a sphere, the top of the device and the body of the device might form a continuous surface, with a portion of the top forming a generally horizontal surface and a portion of the body forming a generally vertical surface. A variety of sizes are also an option depending on the intended audience as well as material choice. For instance a public art display may require a 15 foot tall version with sloped or angled top to prevent climbing, and made of stainless steel, aluminum, plastic, or concrete, dependent on budget, environment, audience, and so on. As another example, a rotatable drawing device according to the present invention might be mounted on a wall, or a ceiling. In that case, what is called herein the "top" and the "horizontal surface" (and possibly the "body" and the "vertical surface") would be reoriented, but the terms are still intended to apply. While in the embodiments shown, the base is an integral flat platform, permanent rotatable devices might use a pole sunk into a foundation as the base.

What is claimed is:

1. A rotatable drawing device comprising:
a body with walls including a generally vertical surface;
a top connected to the body, the top including a generally horizontal surface;
a base; and
a rotation unit connecting the base to the body and allowing the body to rotate with respect to the base;
wherein both the vertical surface and the horizontal surface are coated with a substance configured to accept a drawing medium such that the body and the top form a rotatable drawing surface.

2. The rotatable drawing device of claim 1, wherein the body forms a cylinder, and the top forms a disk capping the cylinder.

3. The rotatable drawing device of claim 2, wherein the top further forms an indentation around its periphery configured to hold a drawing medium.

4. The rotatable drawing device of claim 1 wherein the rotation unit comprises a lazy susan bearing.

5. The rotatable drawing device of claim 1 wherein the rotation unit comprises a clevis pin and a cotter pin.

6. The rotatable drawing device of claim 1 wherein the drawing surface comprises a whiteboard.

7. The rotatable drawing device of claim 1 wherein the drawing surface comprises a chalkboard.

8. The rotatable drawing device of claim 1 wherein the body includes slanted sides.

9. The rotatable drawing device of claim 1 wherein the body includes curved sides.

10. The rotatable drawing device of claim 1 wherein the top includes slanted sides.

11. The rotatable drawing device of claim 1 wherein the top includes curved sides.

12. The rotatable drawing device of claim 1 wherein the body comprises one of the following materials: wood, concrete, metal, molded plastic, or rubber.

* * * * *